(12) United States Patent
Shi et al.

(10) Patent No.: US 12,464,018 B2
(45) Date of Patent: Nov. 4, 2025

(54) SYSTEM AND METHOD FOR HIGH-RESOLUTION BLACKBOX PATCH ATTACK WITH BAYESIAN OPTIMIZATION

(71) Applicant: Robert Bosch GmbH, Stuttgart (DE)

(72) Inventors: Jianghong Shi, Pittsburgh, PA (US); Devin T. Willmott, Pittsburgh, PA (US); Wan-Yi Lin, Wexford, PA (US); Filipe J. Cabrita Condessa, Pittsburgh, PA (US); João D. Semedo, Pittsburgh, PA (US)

(73) Assignee: Robert Bosch GmbH (DE)

( * ) Notice: Subject to any disclaimer, the term of this patent is extended or adjusted under 35 U.S.C. 154(b) by 153 days.

(21) Appl. No.: 18/399,970

(22) Filed: Dec. 29, 2023

(65) Prior Publication Data
US 2025/0220042 A1 Jul. 3, 2025

(51) Int. Cl.
*H04L 9/40* (2022.01)
*G06F 8/65* (2018.01)

(52) U.S. Cl.
CPC ............ *H04L 63/1466* (2013.01); *G06F 8/65* (2013.01)

(58) Field of Classification Search
CPC ............................... H04L 63/1466; G06F 8/65
See application file for complete search history.

(56) References Cited

U.S. PATENT DOCUMENTS

| | | | |
|---|---|---|---|
| 9,996,902 B2 * | 6/2018 | Milanfar | ............... G06T 3/40 |
| 11,941,823 B2 | 3/2024 | Xu et al. | |
| 12,002,055 B1 | 6/2024 | Miller et al. | |
| 12,019,740 B2 | 6/2024 | Trost et al. | |
| 2008/0168561 A1 | 7/2008 | Durie et al. | |
| 2018/0350085 A1 * | 12/2018 | Lu | ............... G06T 11/60 |
| 2020/0057965 A1 * | 2/2020 | Howard | ............... A61P 25/28 |
| 2021/0025679 A1 | 1/2021 | Hoch et al. | |
| 2021/0064938 A1 * | 3/2021 | Ahuja | ............... G06V 10/764 |
| 2023/0004754 A1 * | 1/2023 | Fan | ............... G06V 10/82 |

(Continued)

OTHER PUBLICATIONS

Shukla, Sahu, Willmott, and Kolter, Black-box Adversarial Attacks with Bayesian Optimization, https://arxiv.org/abs/1909.13857, Sep. 30, 2019 (Year: 2019).*

(Continued)

*Primary Examiner* — Vance M Little
(74) *Attorney, Agent, or Firm* — Dickinson Wright PLLC

(57) ABSTRACT

A system includes a controller configured to generate an original patch utilizing Bayesian optimization, output the original patch at a display at a scene and determine if the original patch does not meet a success criteria of the machine-learning model, in response to the original patch not meeting the success criteria, upscaling the patch, decompose the upscaled patch into o components, for each of the components, utilize Bayesian optimization to update one of the components of the upscaled patch and freezing the other components to generate an updated patch, in response to the updated patch meeting the success criteria, output the updated upscaled patch, and in response to the updated upscaled patch not meeting the success criteria, iteratively update the unfrozen components and determine if the success criteria is met and if not met, unfreeze the frozen components and iteratively update the unfrozen components until the success criteria is met.

20 Claims, 10 Drawing Sheets

Pipeline Of The Method

(56) References Cited

U.S. PATENT DOCUMENTS

| | | | |
|---|---|---|---|
| 2023/0259658 A1* | 8/2023 | Munoz Delgado | ... G06T 7/0002 726/22 |
| 2024/0064157 A1* | 2/2024 | Koseki | ............... H04L 63/1408 |
| 2024/0095891 A1* | 3/2024 | Saha | ........................ G06T 7/11 |
| 2024/0098188 A1 | 3/2024 | Kaznocha et al. | |
| 2024/0193931 A1* | 6/2024 | Su | ........................ G06V 20/58 |
| 2024/0249116 A1* | 7/2024 | Xu | ........................ G06N 3/088 |
| 2024/0414184 A1 | 12/2024 | Barai | |
| 2025/0095373 A1* | 3/2025 | Monteuuis | ............... G06T 7/70 |

OTHER PUBLICATIONS

Satya Narayan Shukla et al., "Black-box Adversarial Attacks with Bayesian Optimization." arXiv:1909.13857v1 [cs.LG] Sep. 30, 2019, 12 Pages.

Francesco Croce et al., "Sparse-RS: a Versatile Framework for Query-Efficient Sparse Black-Box Adversarial Attacks." arXiv:2006.12834v3 [cs.LG] Feb. 8, 2022, 22 Pages.

Bobak Shahriari et al., "Taking the Human Out of the Loop: A Review of Bayesian Optimization." Proceedings of the IEEE | vol. 104, No. 1, Jan. 2016, pp. 148-175.

James Tu et al., "Physically Realizable Adversarial Examples for LiDAR Object Detection." CVPR 2020, pp. 113716-13725.

Andrew Ilyas et al., "Black-box Adversarial Attacks with Limited Queries and Information." Proceedings of the 35 th International Conference on Machine Learning, Stockholm, Sweden, PMLR 80, 2018, 10 Pages.

\* cited by examiner

Illustration Of Spatial Decomposition

Illustration Of Frequency-Domain Decomposition

SYSTEM AND METHOD FOR HIGH-RESOLUTION BLACKBOX PATCH ATTACK WITH BAYESIAN OPTIMIZATION

TECHNICAL FIELD

The present disclosure relates to machine learning networks, including those that may be vulnerable to adversarial attacks.

BACKGROUND

Blackbox adversarial attack has access only to the output or loss of the model for a given input, not the model weights. For each query, the attackers must update the adversarial perturbation to obtain a new input-output pair from the model. Physically realizable attacks modify the scene, or the path between the scene and the camera, by placing an adversarial and hence is a more realistic threat model. Prior systems, such as Spares-RS, may proposes a sparse-search method for 10 attack, which can be easily modified into patch attack, which is one of the physically-realizable attack where the patches can be printed out and placed in the scene to make the machine learning model fail. However, such a system and method may limit the search space for each pixel value to the extreme (0 or 255 in pixel value of each channel) values. Although this largely reduced search space, it also significantly limits the number of allowed perturbations in the search space and therefore reduces the attack strength, e.g., likelihood of successfully attack the ML model.

Other systems may tackle such problems by using Bayesian Optimization to update the adversarial patch. Such a system may allow the patch pixel value to be any integer value between 0 and 255. But Bayesian optimization only works well for low-dimensional input and hence limits the resolution, and hence the degree of freedom, of the adversarial patch.

SUMMARY

According to a first embodiment, a computer-implemented method for attacking a machine-learning model includes generating a patch utilizing Bayesian optimization and for use at the machine-learning model, wherein the patch includes adversarial patterns to attack the machine-learning model, outputting the patch at a display at a scene and determine if the patch does not meet a success criteria of the machine-learning model, in response to the patch not meeting the success criteria, upscaling the patch utilizing a scaling factor (K) to generate an upscaled patch, decomposing the upscaled patch into one or more components associated with either (1) regions of pixels or (2) regions of spectrums associated with the upscaled patch, for each of the one or more components of the upscaled patch, utilizing Bayesian optimization to update one of the components of the upscaled patch and freezing the other components of the upscaled patch to generate an updated upscaled patch including adversarial patterns, in response to the updated upscaled patch meeting the success criteria, output the updated upscaled patch, in response to the updated upscaled patch not meeting the success criteria, iteratively update the unfrozen component of the updated upscaled patch and determine if the success criteria is met and if not met, unfreeze the frozen components and iteratively update the unfrozen components until the success criteria is met and outputting a final upscaled patch at the display.

According to a second embodiment, a computer-implemented method for attacking a machine-learning model may include generating a low-resolution patch utilizing Bayesian optimization and for use at the machine-learning model, outputting the patch at a display at a scene and determine if the low-resolution patch does not meet a success criteria of the machine-learning model; in response to the low-resolution patch not meeting the success criteria, upscaling the low-resolution patch utilizing a scaling factor to generate an upscaled patch, decomposing the upscaled patch into one or more components associated with either regions of pixels or regions of spectrums associated with the upscaled patch, for each of the one or more components of the upscaled patch, utilize Bayesian optimization to update one of the components of the upscaled patch and freezing the other components of the upscaled patch to generate an updated upscaled patch including adversarial patterns, in response to the updated upscaled patch not meeting the success criteria, iteratively update the unfrozen component of the updated upscaled patch and determine if the success criteria is met and if not met, unfreeze the frozen components and iteratively update each of the unfrozen components until the success criteria is met and output a final upscaled patch at the display in response to the unfrozen components meeting the success criteria.

According to a third embodiment, a system includes a controller configured to generate an original patch utilizing Bayesian optimization and based on an objective function of the machine-learning model, output the original patch at a display at a scene and determine if the original patch does not meet a success criteria of the machine-learning model, in response to the original patch not meeting the success criteria, upscaling the patch to generate an upscaled patch, decompose the upscaled patch into one or more components associated with either regions of pixels or regions of spectrums associated with the upscaled patch, for each of the one or more components of the upscaled patch, utilize Bayesian optimization to update one of the components of the upscaled patch and freezing the other components of the upscaled patch to generate an updated upscaled patch containing frozen and unfrozen components, in response to the updated upscaled patch meeting the success criteria, output the updated upscaled patch, and in response to the updated upscaled patch not meeting the success criteria, iteratively update the unfrozen component of the updated upscaled patch and determine if the success criteria is met and if not met, unfreeze the frozen components and iteratively update the unfrozen components until the success criteria is met.

DETAILED DESCRIPTION

Figure 1:
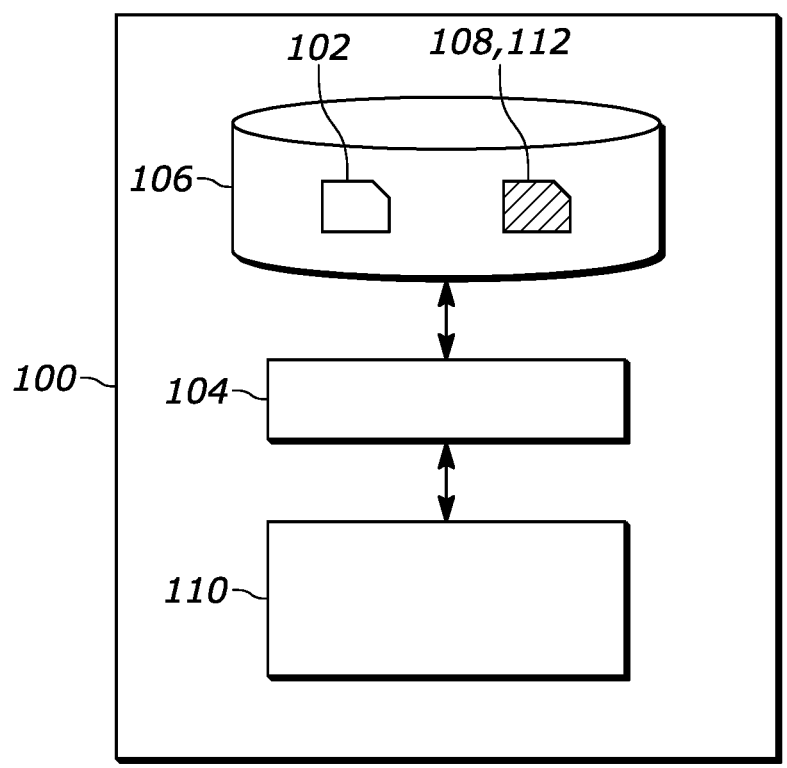
FIG. 1 shows a system for training a neural network, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

The system may propose methods to create high-resolution black box patch attack utilizing Bayesian optimization. The embodiments of the system and method may divide the adversarial patch into subregions in either frequency or spatial domain, then iteratively update each subregion using Bayesian optimization.

Deep learning image models have shown state-of-the-art performance on many tasks including classification, dense prediction, and regression tasks. However, these models are known to be brittle, where a small perturbation in the input space can cause false predictions. Such perturbations may be called an adversarial attack.

By the knowledge available to the attacks, an adversarial attack can be divided into two categories-whitebox attack where the attacker has full knowledge of the model, and blackbox attack where the attacker may only query model output with corresponding input. Similarly, by the level of access to the input of the model, adversarial attack may also fall in two categories: (1) digital attack where the attacker has access to the direct input to the model hence every pixel of the input image can be altered; and (2) the physically-realizable attack where the attacker cannot access the input directly but can add objects to the scene.

The system and method of the current disclosure may consider the most realistic attack-physically realizable blackbox attack, that the attacker puts an object (for example, a monitor) in the scene with adversarial patterns on it. The attacker may update the adversarial pattern by querying model output, without model gradients.

Previous works may utilize Bayesian Optimization to update the adversarial patch, but the resolution of the patch is limited by Bayesian Optimization. Practically Bayesian Optimization only performs well for signals with less than 50 dimensions. Such low dimensionality limits the effectiveness of the attack, since the attack space is small.

The system and method disclosed below may be used to evaluate safety critical ML systems such as autonomous driving systems before deployment. Since no training data is required for generating the attack, this disclosure can provide a fast worst-case performance and shorten development cycles.

Reference is now made to the embodiments illustrated in the Figures, which can apply these teachings to a machine learning model or neural network. FIG. 1 shows a system 100 for training a neural network, e.g. a deep neural network. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104. In other embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers. The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 112 of the trained neural network, this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In other embodiments, the data representation 112 may be stored separately from the data representation 108 defining the 'untrained' neural network. In some embodiments, the output interface may be separate from the data storage interface 104, but may in general be of a type as described above for the data storage interface 104.

The structure of the system 100 is one example of a system that may be utilized to train the image-to-image machine-learning model and the mixer machine-learning model described herein. Additional structure for operating and training the machine-learning models is shown in FIG. 2.

Figure 2:
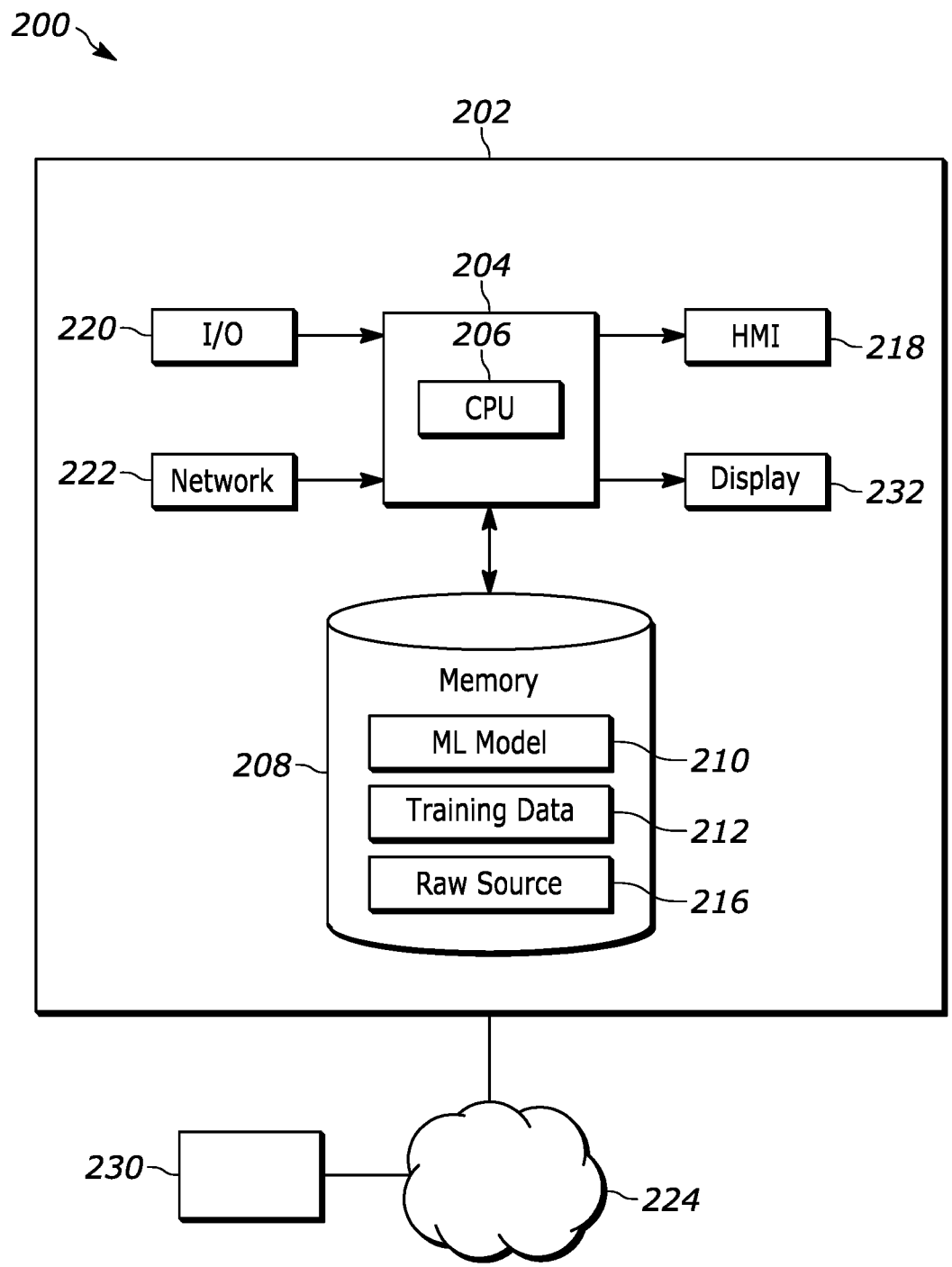
FIG. 2 shows a computer-implemented method for training and utilizing a neural network, according to an embodiment.

FIG. 2 depicts a system 200 to implement the machine-learning models described herein, for example the image-to-image machine-learning model, the mixer machine-learning model, and the pre-trained reference model described herein. The system 200 can be implemented to perform image quantization processes described herein. The system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction set such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation. While one processor 204, one CPU 206, and one memory 208 is shown in FIG. 2, of course more than one of each can be utilized in an overall system.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 is used to transfer information between internal storage and external input and/or output devices (e.g., HMI devices). The I/O 220 interface can includes associated circuitry or BUS networks to transfer information to or between the processor(s) and storage. For example, the I/O interface 220 can include digital I/O logic lines which can be read or set by the processor(s), handshake lines to supervise data transfer via the I/O lines; timing and counting facilities, and other structure known to provide such functions. Examples of input devices include a keyboard, mouse, sensors, etc. Examples of output devices include monitors, printers, speakers, etc. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning algorithm 210 that is configured to analyze the raw source dataset 216. The raw source dataset 216 may include raw or unprocessed sensor data that may be representative of an input dataset for a machine-learning system. The raw source dataset 216 may include video, video segments, images, text-based information, audio or human speech, time series data (e.g., a pressure sensor signal over time), and raw or partially processed sensor data (e.g., radar map of objects). Several different examples of inputs are shown and described with reference to FIGS. 5-11. In some examples, the machine-learning algorithm 210 may be a neural network algorithm (e.g., deep neural network) that is designed to perform a predetermined function. For example, the neural network algorithm may be configured in automotive applications to identify street signs or pedestrians in images. The machine-learning algorithm(s) 210 may include algorithms configured to operate the image-to-image machine-learning model, the mixer machine-learning model, and the pre-trained reference model described herein.

The computer system 200 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include input images that include an object (e.g., a street sign). The input images may include various scenarios in which the objects are identified.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., a reconstructed or supplemented image, in the case where image data is the input) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), or convergence, the machine-learning algorithm 210 may be executed using data that is not in the training dataset 212. It should be understood that in this disclosure, "convergence" can mean a set (e.g., predetermined) number of iterations have occurred, or that the residual is sufficiently small (e.g., the change in the approximate probability over iterations is changing by less than a threshold), or other convergence conditions. The trained machine-learning algorithm 210 may be applied to new datasets to generate annotated data.

The machine-learning algorithm 210 may be configured to identify a particular feature in the raw source data 216. The raw source data 216 may include a plurality of instances or input dataset for which supplementation results are desired. For example, the machine-learning algorithm 210 may be configured to identify the presence of a road sign in video images and annotate the occurrences. The machine-learning algorithm 210 may be programmed to process the raw source data 216 to identify the presence of the particular features. The machine-learning algorithm 210 may be configured to identify a feature in the raw source data 216 as a predetermined feature (e.g., road sign). The raw source data 216 may be derived from a variety of sources. For example, the raw source data 216 may be actual input data collected by a machine-learning system. The raw source data 216 may be machine generated for testing the system. As an example, the raw source data 216 may include raw video images from a camera.

In an example, the raw source data 216 may include image data representing an image. Applying the machine-learning algorithms (e.g., image-to-image machine learning model, mixer machine-learning model, and pre-trained reference model) described herein, the output can be a quantized version of the input image.

Figure 3:
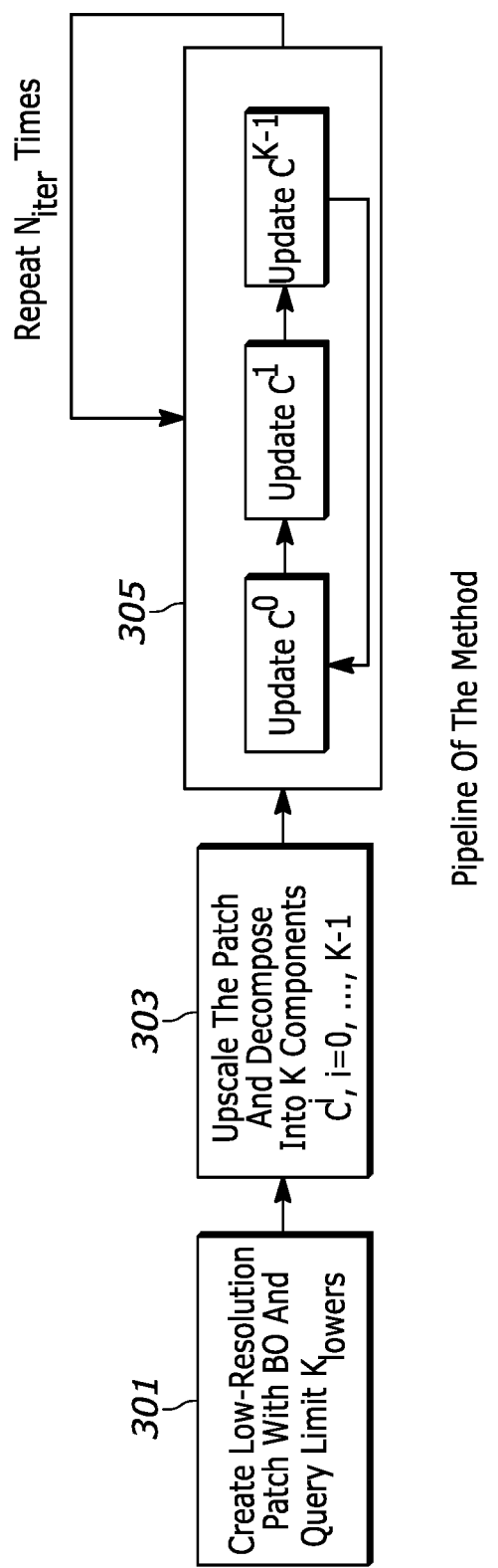
FIG. 3 illustrates an example flow chart for updating a patch associated with an adversarial attack.

FIG. 3 discloses an illustrative flow chart for updating a low-resolution patch associated with an adversarial attack. The system may utilizing as input a machine learning system f(.), scene S, display function M, render function A. In addition, a loss function l(.,.) may be utilized. The low-resolution patch's resolution is h×w, where 3hw<50, and scaling factor K to create a high-resolution patch with resolution Kh×Kw. There may be a maximal number of queries $K_{max}$, which is the sum of the following components (1) number of queries for creating low-resolution patch $K_{lowres}$ including initial queries $K_{ini}$; (2) $K*(K_{ini}-1)$ extra initial queries for the K components; and (3) $K*N_{iter}*K_{iter}$ queries for iteratively update each component. Total number of iteration over all component is $N_{iter}$ and each component in each iteration, each component is updated $K_{iter}$ times.

As optional inputs to the system and method, the system may receive a desired output $y_{target}$ for targeted attack. It may also receive a benign output $y_{gt}$ for untargeted attack. The system may also utilize a success criteria $g(\delta)$. The success criteria may be a threshold or any other type of measurable. For example, the success criteria may include a number of iterations (e.g. a iteration threshold), a loss threshold (e.g. a measurement of loss of the model), or any other type of threshold.

At step 301, the system may first create a low-resolution patch. The low-resolution patch may be created via constructing an objective function $h(\delta)$ using (Equation 1) with $y_{target}$ or (Equation 2) with $y_{gt}$. As a next step to creating the low-resolution patch, the system may randomly select $K_{ini}$ points $\{81, \ldots, 8\%\}$ in $[0,1]^{h \times w \times 3}$, display each $\delta_i$, i=1, . . . , $K_{ini}$ on the screen in the scene, obtain ML model output $f(A(S+M(\delta_i)))$ to evaluate $h(.)$ at the selected points. The system may use $h(\delta_1), \ldots, h(\delta_K)$ to estimate mean and covariance of the prior distribution as in (Equation 3). At a next step, the system may select the next attack pattern $\delta_i$ using (Equation 5), and then compute an objective function $h(\delta_i)$ and success criteria $g(\delta_i)$. In one scenario, if $g(\delta_i)=1$, return $\delta_i$ as a successful attack pattern. In another scenario, if $g(\delta_i)=0$ and $i<K_{lowres}$, the system may repeat this step to update the scaling factor of components. In yet another scenario, if $g(\delta_i)=0$ and $i=K_{lowres}$, stop updating low-resolution patch and proceed to the next step 2 below. This process is described above and also described in U.S. application Ser. No. 18/399,939, filed Dec. 29, 2023, which is herein incorporated by reference in its entirety.

At step 303, the system may upscale the patch to Kh×Kw resolution, followed by decomposing the upscaled patch into components. For upscaling the low-resolution patch, the upscaling factor K may already be user-defined and predetermined at the system. The system may then display the upscaled patch on a display with display function M. The display function M may include any type of output device, such as a monitor or a speaker.

Figure 4A:
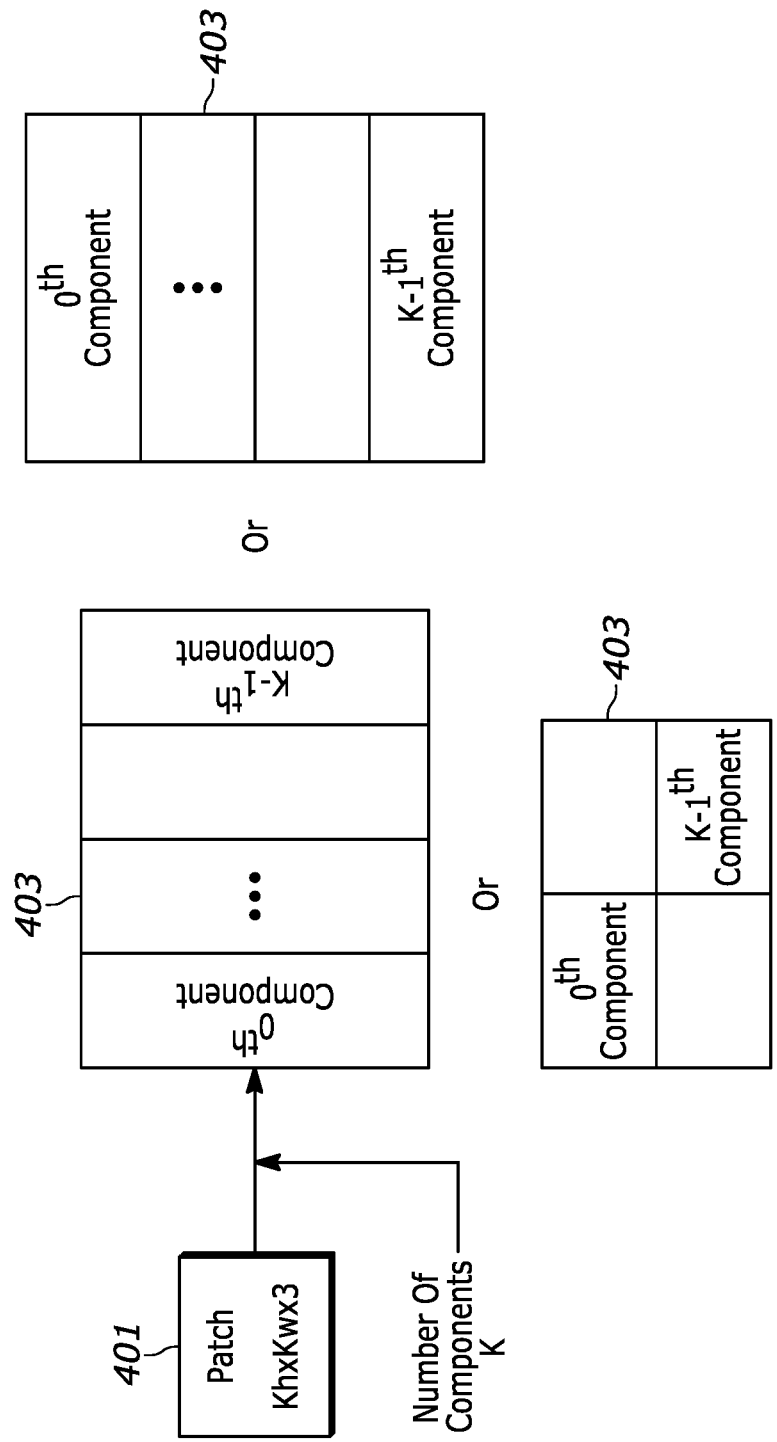
FIG. 4A illustrates a first embodiment utilizing spatial domain decomposition.
Figure 4B:
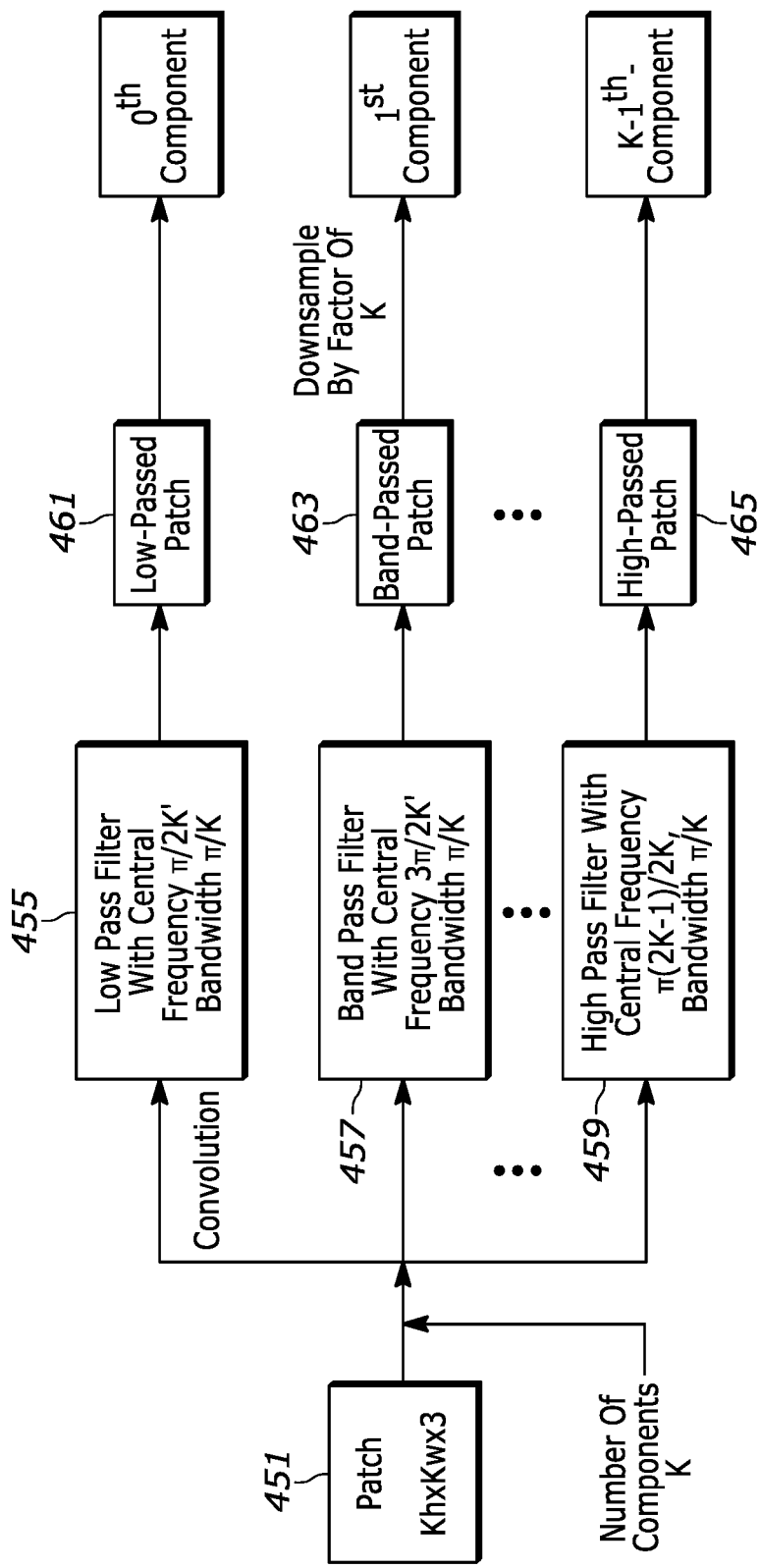
FIG. 4B illustrates an alternative embodiment utilizing frequency-domain decomposition.

The system man then decompose the up-scaled patch. Decompose the patch using either spatial or frequency domain decomposition as shown in FIG. 4A or 4B into components $C^i$, i=0, ..., K. For each component $C^i$, i=0, ..., K−1, the system may estimate mean and variance for BO: let $C^i_1$ be the initial value of the component. Randomly select $K_{ini}$−1 points $\{C^i_2, ..., C^i_k\}$ in $[0,1]^{h \times w \times 3}$, merge each $C^i_j$ back to the high-resolution patch to create $\delta_i$, i=1, ..., $K_{ini}$. Then display each $\delta_i$ on the screen in the scene, obtain ML model output $f(A(S+M(\delta_i)))$ to evaluate h(.) at the selected points. Use $h(C^i_1), ..., h(C^i_k)$ to estimate mean and covariance of the prior distribution.

At step 305, the system and method may apply iterative updates to the components of the upscaled patch. For each component $C^i$, i=0, ..., K−1, iteratively update the components, which may include select the next component $C^i_j$ using (5), merge $C^i_j$ with other components to patch $\delta_j$, display $\delta_j$, query model f and compute $h(C^j_i)$ and $g(\delta_j)$. The system may evaluate the upscaled patch to a success criteria (e.g. a threshold). If $g(\delta_j)$=1, return &j as a successful attack pattern. If $g(\delta_j)$=0 and $j<K_{iter}$, the system may repeat this step. If $g(\delta_j)$=0 and i=$K_{iter}$, the system may stop updating this component then update next component.

The system may repeat step 305 $N_{iter}$ times. For example, the iterative updates may be repeated until a success criteria is met or a threshold amount of iterations has been met or exceeded. For example, the system may return attack failure if success criteria is not met after this step.

The objective of an adversarial attack ($\delta$) can be either targeted or untargeted. For targeted attack, the attacker may wish to bring $f(A(S+M(\delta)))$ as close to a target output $y_{target}$ as possible—in classification this can be a particular class, in regression this can be a value or vector, and in dense prediction this can be a segmentation map. The targeted attack objective function is:

(Equation 1)
$$\max\_\{\delta\} h(\delta, S, M, A, y) = \min\_\{\delta\} l(fA(S + M(\delta))), y\_\{target\}) = \max\_\{\delta\} l(fA(S + M(b))), y\_\{target\}) - l(fA(S + M(\delta))), y\_\{target\}),$$
$$\delta \in [0, 1]^{h \times w \times 3},$$

where $l(fA(S+M (b))),y\_\{target\})$ is the loss between the model output of a benign scene b and target $y_{target}$, and h, w represents the spatial resolution of the patch.

When conducting an untargeted attack, the attackers may aim to bring the model output as far away from a benign input as possible. The attackers may then first display a benign image b on the screen and query f for the benign label $y_{gt}$. The untargeted attack objective function is:

(Equation 2)
$$\max_\delta h(\delta, S, M, A, y) = \max_\delta l(f(A(S + M(\delta))), y_{gt}), \delta \in [0, 1]^{h \times w \times 3}.$$

Note that $\delta$ is an adversarial pattern if $h(\delta,S,M,A,y)>0$ for (Equation 1) or (Equation 2).

Certain systems may uses Bayesian optimization (BO) to update low-dimensional attack. For a patch attack, the system may assume that the patch dimension is w×h×3, where 3wh≤50.

The Gaussian process model for blackbox attack in prior systems may be used to initialize and update $\delta$ with Bayesian optimization using the objective function $h(\delta,S,M,A,y)$ formulated in either (Equation 1) or (Equation 2). For a given scene(S), monitor display (M), renderer (A), and the target output $y_{target}$ or benign output $y_{gt}$, the system may simplify $h(\delta, S, M, A, y)$ into $h(\delta)$. The Gaussian process approximates the joint distribution of any finite set of samples of $h(\delta)$ as a multi-variant Gaussian variable, e.g., $P(h(\delta_1), ..., h(\delta_k)) \sim \mathcal{N}(\mu, \Sigma)$, where $\mu=[\mu, ..., \mu]$. (Equation 3)

The system use constant mean $\mu_0$ and Matern Kernel as the covariance function for the prior distribution. By Bayes rule, given Equation 3, one can easily compute the conditional distribution of the objective function h(.) at any point $\delta_k$, as it is also a normal distribution::

(Equation 4)
$$P(h(\delta_k) | h(\delta_1), ..., h(\delta_{k-1})) = P(h(\delta_1), ..., h(\delta_k))/P(h(\delta_1), ..., h(\delta_{k-1})).$$

Using Equation 4, given prior attack $\delta_1, ..., \delta_{k-1}$, the BO then select the next attack $\delta_k$ that maximizes the exceptive improvement of h(.):

(Equation 5)
$$\delta_k = \mathrm{argmax}_{\backslash delta} E_k[\max(h(\delta) - h^*_{k-1}, 0)],$$
where
$$h^*_{k-1} = \max(h(\delta_1), ..., h(\delta_{k-1})).$$

The attacker then display $\delta\_k$ on the screen, query the output of the network $f(A(S+M (\delta\_k)))$, compute $h(\delta\_k)$ until either the output or the objective function satisfies the success condition $g(\delta)$: $[0,1]\hat{}(w \times h \times 3) \to \{0,1\}$, where 1 indicates success, or the number of queries have reached the limit. For classification models, the success condition could be $f(A(S+M(\delta\_k))) \neq y\_gt$ for untargeted attack or $f(A(S+M (\delta\_k)))=y\_target$ for targeted attack. For other tasks, the success condition could be $h(\delta\_k)>=TH$, where TH is a pre-set threshold value.

FIG. 4A is an illustration of an embodiment of a spatial decomposition. Since Bayesian Optimization may limit the dimension of the adversarial patch to less than 50 pixels, with some scenes the patch may not satisfy the success criteria within a query limit. This poses the need to increase the dimensionality of the patch. In one embodiment, the system may propose a decompose-and-update approach for increasing patch dimensionality, given the min-loss low-resolution patch. First, the system may up sample the patch to increase the resolution by K times then decompose the patch into K components and label them 0th to K−1th components. This decomposition can happen in spatial domain or frequency domain:

Spatial domain decomposition may group the pixels into K sub-regions. For example, the upscaled patch 401 may be broken into a variety of components 403 that group or split the pixels in an equal number. In some embodiments, the components may not be broken into components of equal pixels. For example, if K=2, then divide the patch into bottom or left half (0th component) and upper or right half (1st component). An illustration of this grouping is also shown in FIG. 4A. In another embodiment, such as the one illustrated in 403, the patch may be split equally amongst both vertical and horizontal regions.

FIG. 4B illustrates an embodiment of frequency-domain decomposition. As an example, a patch 451 may be a high-resolution patch of Kh×Kw×3. Based on the number of components K, the decomposition routine may apply convolution to the patch at each component. The decomposition routine may create a low-passed patch, a band-passed patch, and a high-passed patch. The system may first create a set of band-pass (including low/high-pass) filters with bandwidth $\pi/K$: {Fi: band-pass filter with central frequency $((2i-1)\pi)/2K$}_(i=0)^(K-1) that spans over the whole frequency band (from 0 to $\pi$). For example, there may be a low pass filter 455 with a central frequency of $\pi/2K$ and bandwidth $\pi/K$. The band-pass filter 457 may have a central frequency of $3\pi/2K$ and bandwidth $\pi/K$. The high-pass filter 459 may have a central frequency of $\pi(2k-1)/2K$ and bandwidth n/K. Each of the filters may make a respective patch, a low-passed patch 461, a band-passed patch 463, and a high-passed patch 465. The process may thus involve making k copies of the patch and convolve the ith copy with Fi to create a set of band-passed patches followed by downsampling each band-passed patch by K to create the components.

By either spatial or frequency domain decomposition, each component (from 0th to K−1th) may have the same number of pixels as the original patch. Then the whole patch can be updated by iteratively updating each component and merge the components back to a high-resolution image. The high-resolution image may be utilized at the scene to determine Merging components decomposed in spatial domain may involve creating an empty patch that is Kh×Kw×3 then copy each component to its corresponding spatial location. Components decomposed in frequency domain would first be upsampled to Kh×Kw×3. Next, the system may be pixel-wise added to all other components to reconstruct the high-resolution patch.

Figure 5:
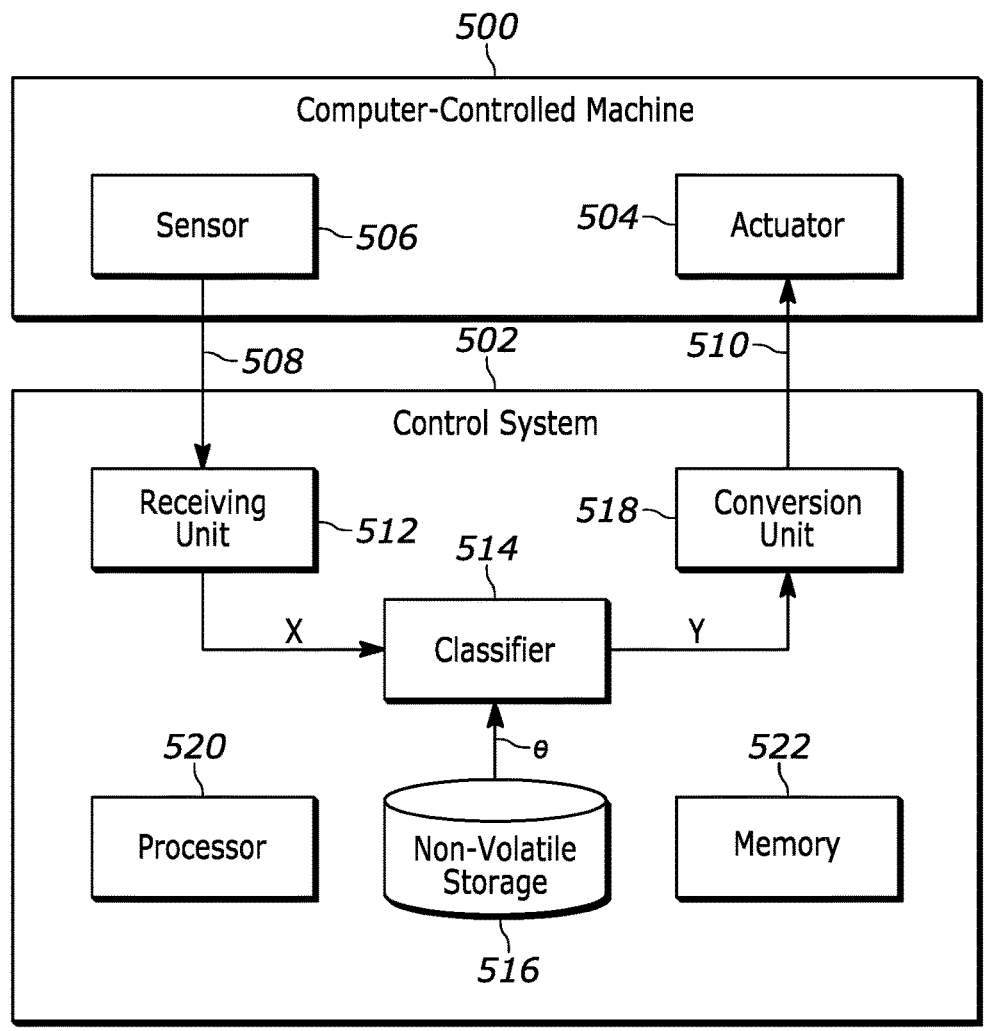
FIG. 5 depicts a schematic diagram of an interaction between a computer-controlled machine and a control system, according to an embodiment.

The machine-learning models described herein can be used in many different applications, and not just in the context of road sign image processing. Additional applications where image quantization may be used are shown in FIGS. 6-11. Structure used for training and using the machine-learning models for these applications (and other applications) are exemplified in FIG. 5. FIG. 5 depicts a schematic diagram of an interaction between a computer-controlled machine 500 and a control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. In one embodiment, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes a classifier 514. Classifier 514 may be configured to classify input signals x into one or more labels using a machine learning (ML) algorithm, such as a neural network described above. Classifier 514 is configured to be parametrized by parameters, such as those described above (e.g., parameter θ). Parameters θ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In another embodiment, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In another embodiment, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., machine-learning algorithms, such as those described above with regard to pre-trained classifier 306) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more ML algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the ML algorithms and/or methodologies as disclosed herein. Non-volatile storage 516 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
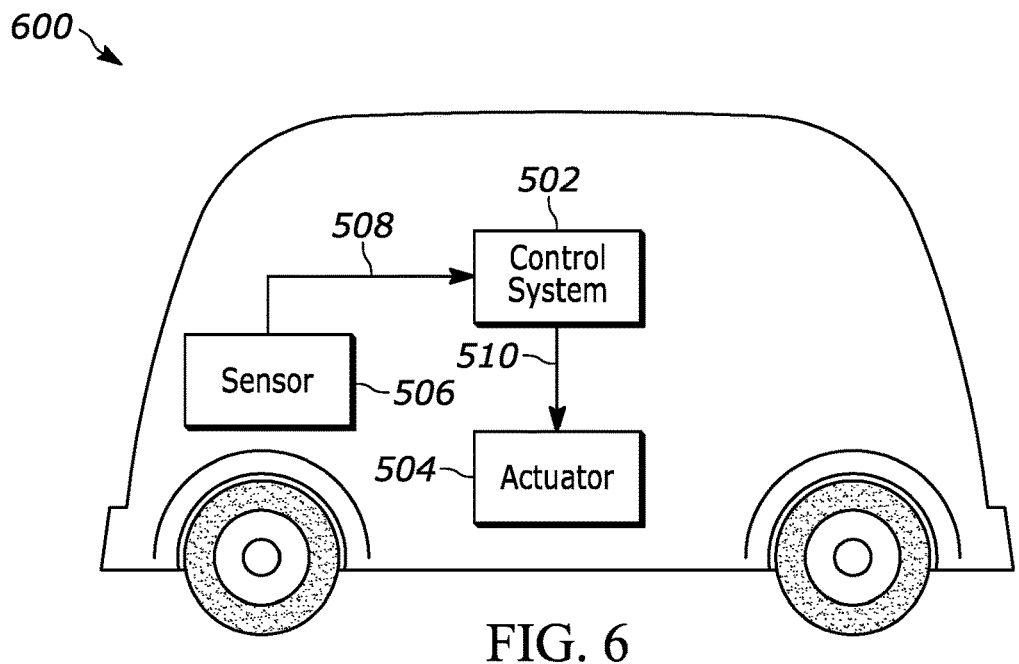
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to an embodiment.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. In the context of sign-recognition and processing as described herein, the sensor 506 is a camera mounted to or integrated into the vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In embodiments where vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In other embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In another embodiment, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
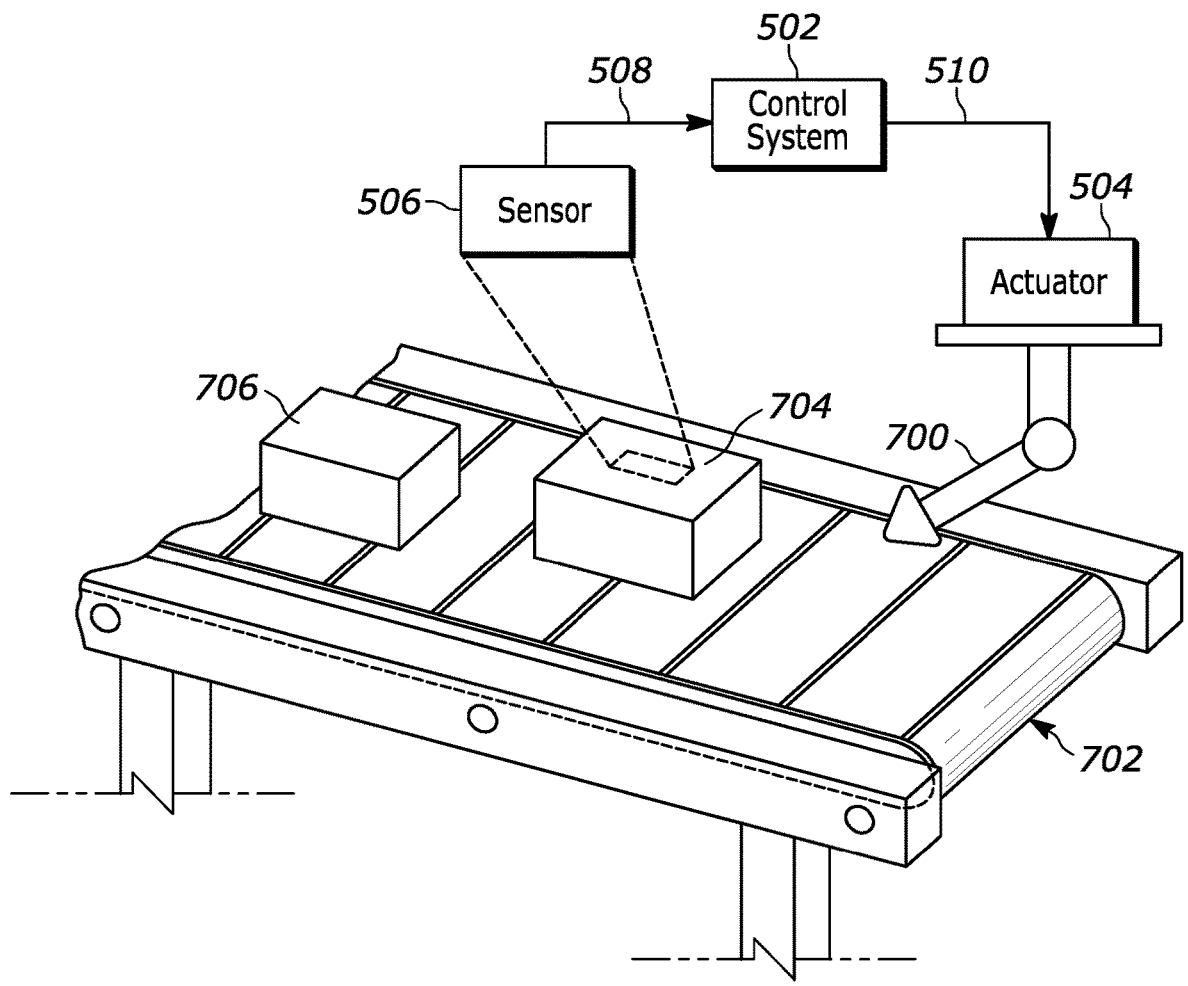
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 106 of system 700 (e.g., manufacturing machine) depending on the determined state of manufactured product 704.

Figure 8:
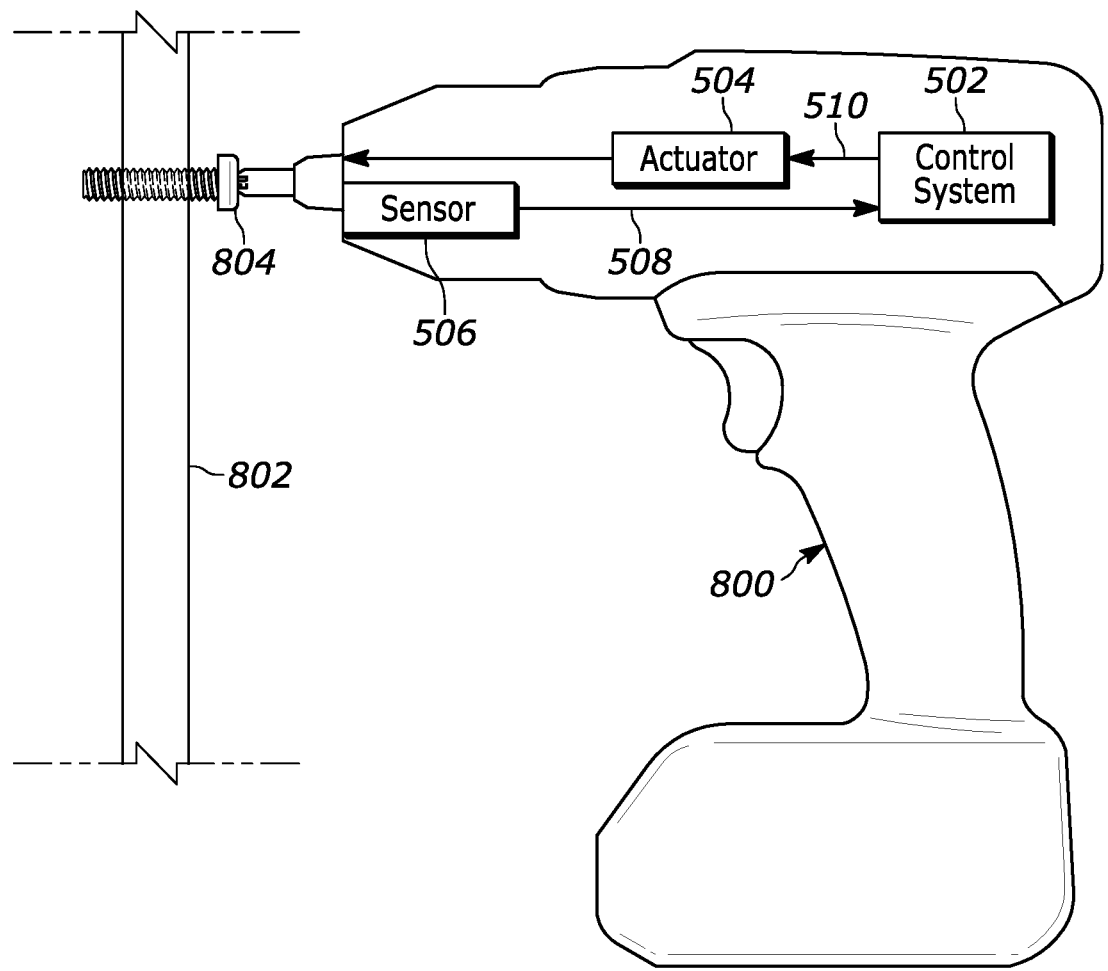
FIG. 8 depicts a schematic diagram of the control system of FIG. 5 configured to control a power tool, such as a power drill or driver, that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
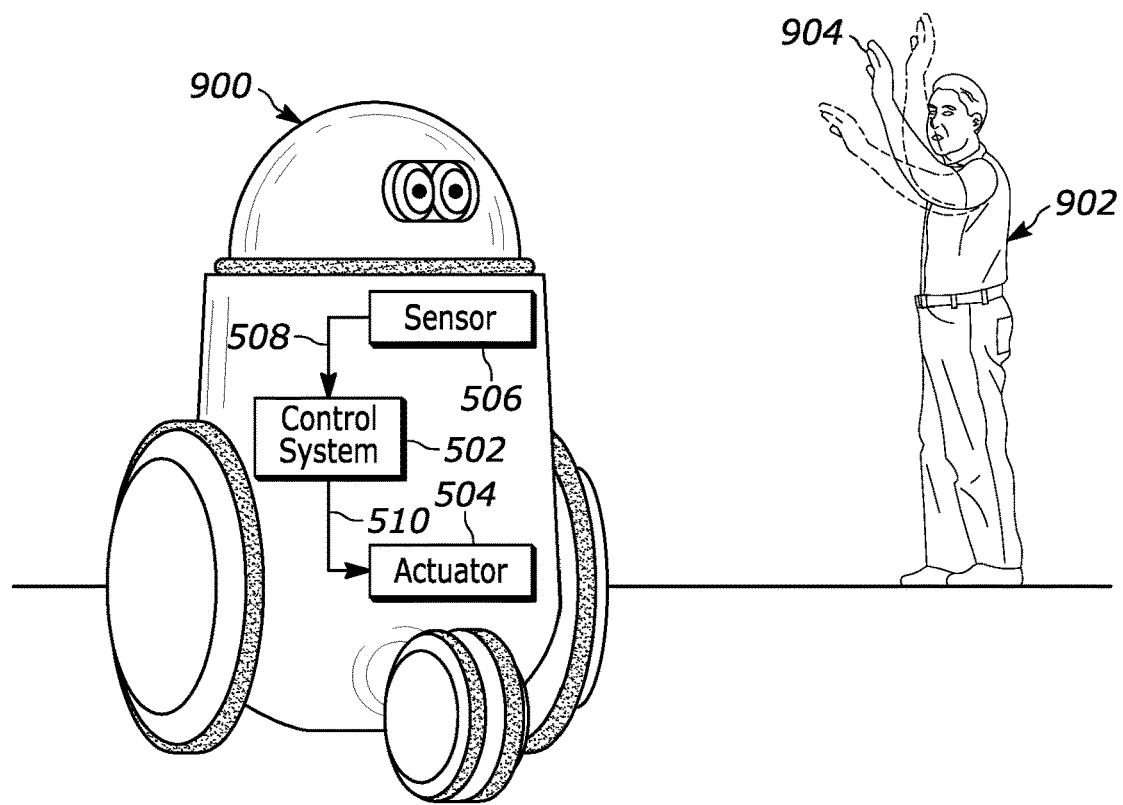
FIG. 9 depicts a schematic diagram of the control system of FIG. 5 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
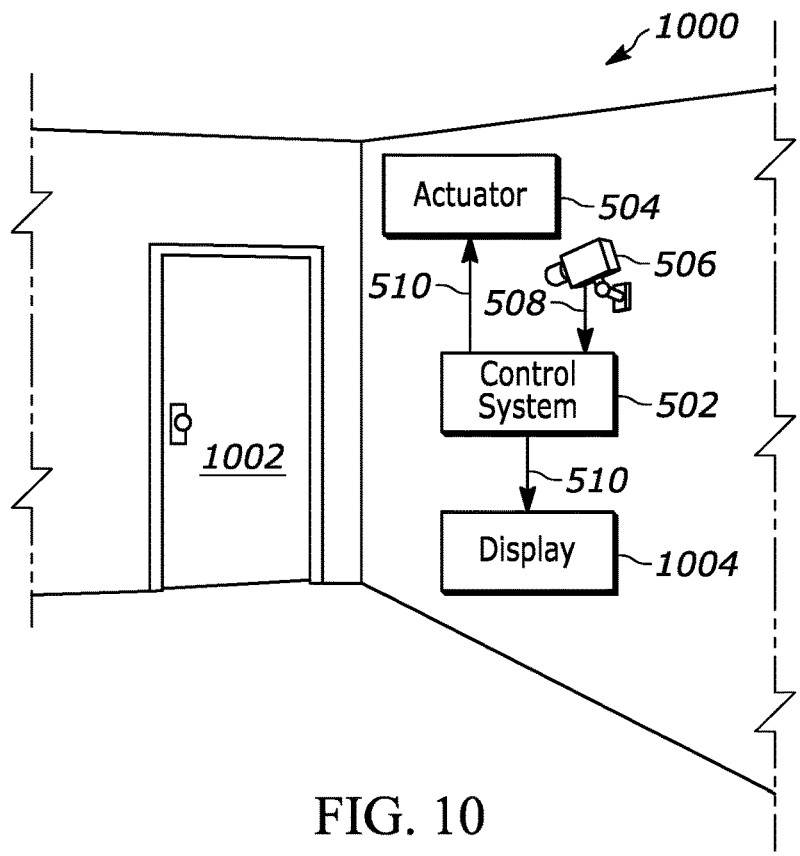
FIG. 10 depicts a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In other embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
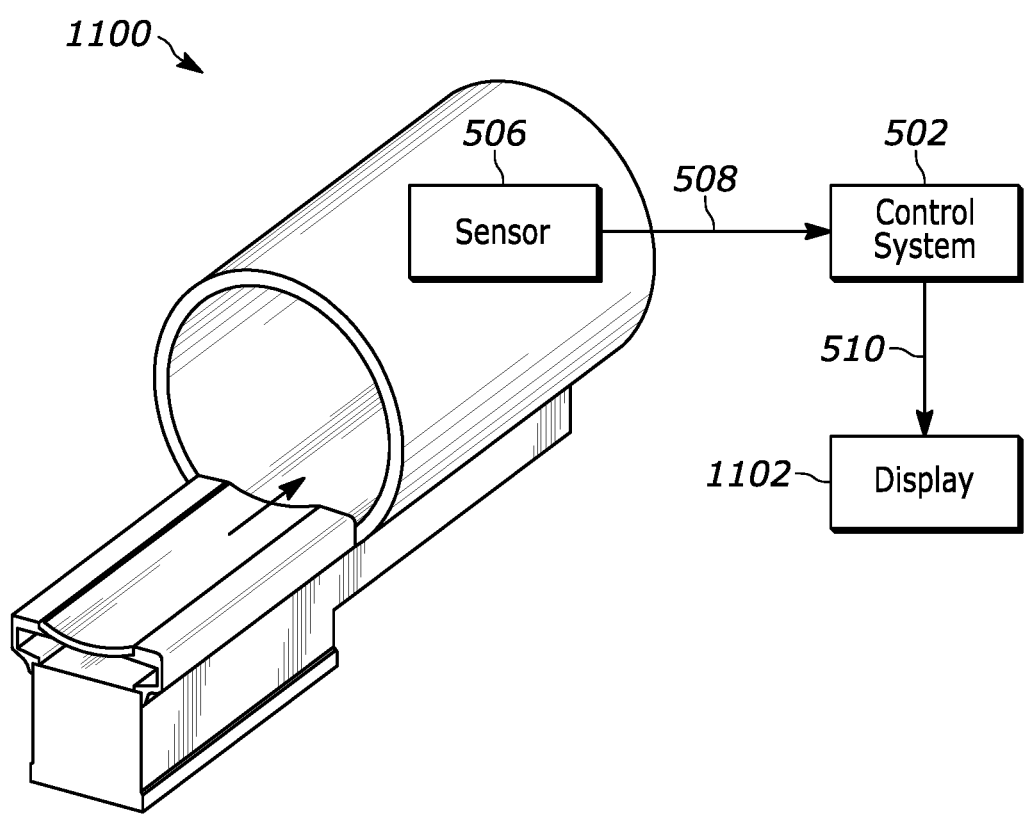
FIG. 11 depicts a schematic diagram of the control system of FIG. 5 configured to control an imaging system, for example an MRI apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method for attacking a machine-learning model, comprising:
   generate a patch utilizing Bayesian optimization and for use at the machine-learning model, wherein the patch includes adversarial patterns to attack the machine-learning model;
   output the patch at a display at a scene and determine if the patch does not meet a success criteria of the machine-learning model;
   in response to the patch not meeting the success criteria, upscaling the patch utilizing a scaling factor (K) to generate an upscaled patch;
   decomposing the upscaled patch into one or more components associated with either (1) regions of pixels or (2) regions of spectrums associated with the upscaled patch;
   for each of the one or more components of the upscaled patch, utilizing Bayesian optimization to update one of the components of the upscaled patch and freezing the other components of the upscaled patch to generate an updated upscaled patch including adversarial patterns;
   in response to the updated upscaled patch meeting the success criteria, output the updated upscaled patch;
   in response to the updated upscaled patch not meeting the success criteria, iteratively update the unfrozen component of the updated upscaled patch and determine if the success criteria is met and if not met, unfreeze the frozen components and iteratively update the unfrozen components until the success criteria is met and outputting a final upscaled patch at the display.

2. The computer-implemented method of claim 1, wherein the scaling factor input is 5×5.

3. The computer-implemented method of claim 1, wherein decomposing the upscaled patch into one or more components associated with regions of spectrums includes decomposing in the frequency domain.

4. The computer-implemented method of claim 3, wherein the method includes creating a set of band-pass filters that span over a whole frequency band of the frequency domain.

5. The computer-implemented method of claim 1, wherein the scaling factor is predetermined.

6. The computer-implemented method of claim 1, wherein the patch is a low-resolution patch with a dimension less than 50 pixels.

7. The computer-implemented method of claim 6, wherein decomposing in the spatial domain groups pixels into sub-regions divided vertically or horizontally in the patch.

8. The computer-implemented method of claim 1, wherein decomposing the upscaled patch into one or more components associated with regions of pixels includes decomposing in the spatial domain.

9. The computer-implemented method of claim 1, wherein the method includes initializing and updating the adversarial pattern with Bayesian optimization utilizing the objective function.

10. The computer-implemented method of claim 1, wherein method includes applying the patch to input data that includes video information obtained from the camera.

11. A computer-implemented method for attacking a machine-learning model, comprising:
    generate a low-resolution patch utilizing Bayesian optimization and for use at the machine-learning model;
    output the patch at a display at a scene and determine if the low-resolution patch does not meet a success criteria of the machine-learning model;
    in response to the low-resolution patch not meeting the success criteria, upscaling the low-resolution patch utilizing a scaling factor to generate an upscaled patch;
    decomposing the upscaled patch into one or more components associated with either regions of pixels or regions of spectrums associated with the upscaled patch;
    for each of the one or more components of the upscaled patch, utilize Bayesian optimization to update one of the components of the upscaled patch and freezing the other components of the upscaled patch to generate an updated upscaled patch including adversarial patterns;
    in response to the updated upscaled patch not meeting the success criteria, iteratively update the unfrozen component of the updated upscaled patch and determine if the success criteria is met and if not met, unfreeze the frozen components and iteratively update each of the unfrozen components until the success criteria is met and output a final upscaled patch at the display in response to the unfrozen components meeting the success criteria.

12. The method of claim 11, wherein decomposing the upscaled patch includes decomposing utilizing spatial domain decomposition.

13. The method of claim 11, wherein decomposing the upscaled patch includes decomposing utilizing frequency domain decomposition.

14. The method of claim 11, wherein the final upscaled patch is greater than 50 pixels.

15. The method of claim 11, wherein the low-resolution patch is 50 pixels.

16. The method of claim 11, wherein the scaling factor is predetermined.

17. A system comprising:
    a controller configured to:
       generate an original patch utilizing Bayesian optimization and based on an objective function of the machine-learning model;
       output the original patch at a display at a scene and determine if the original patch does not meet a success criteria of the machine-learning model;
       in response to the original patch not meeting the success criteria, upscaling the patch to generate an upscaled patch;

decomposing the upscaled patch into one or more components associated with either regions of pixels or regions of spectrums associated with the upscaled patch;

for each of the one or more components of the upscaled patch, utilize Bayesian optimization to update one of the components of the upscaled patch and freezing the other components of the upscaled patch to generate an updated upscaled patch containing frozen and unfrozen components;

in response to the updated upscaled patch meeting the success criteria, output the updated upscaled patch;

in response to the updated upscaled patch not meeting the success criteria, iteratively update the unfrozen component of the updated upscaled patch and determine if the success criteria is met and if not met, unfreeze the frozen components and iteratively update the unfrozen components until the success criteria is met.

18. The apparatus of claim 17, wherein the upscaling is conducting by upscaling to a scaling factor, wherein the scaling factor increases the resolution of the upscaled patch compared to the original patch.

19. The apparatus of claim 17, the upscaled patch into one or more components associated with regions of spectrums includes decomposing in the frequency domain.

20. The apparatus of claim 19, wherein the controller is further configured to create a set of band-pass filters that span over a whole frequency band of the frequency domain.

* * * * *